July 4, 1950            P. WARREN            2,514,110
FISHHOOK HOLDER
Filed July 15, 1949
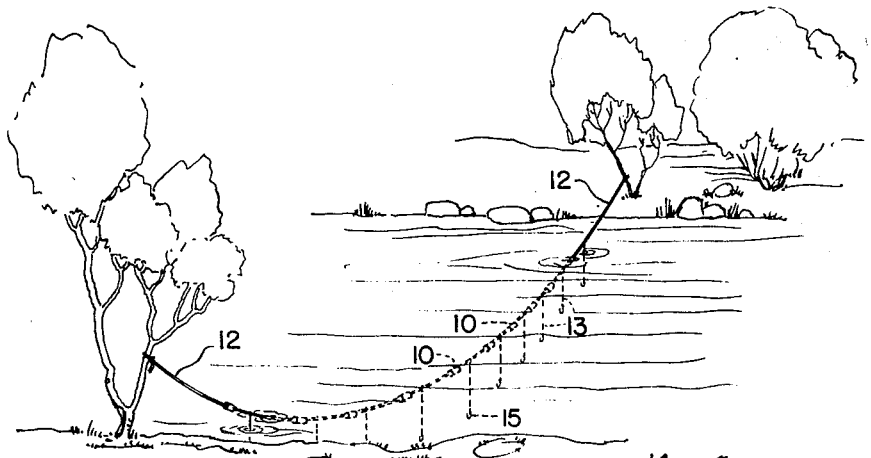
Fig. 1.
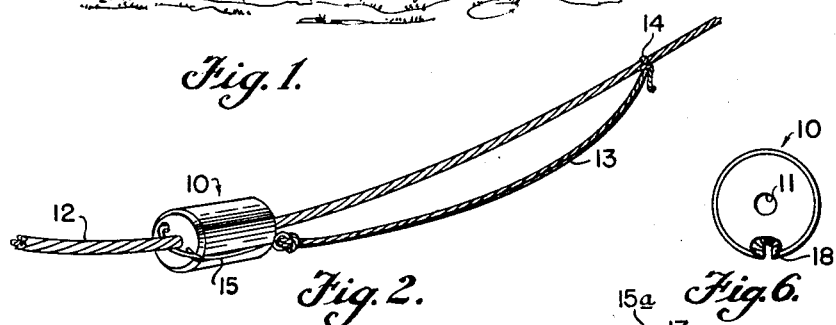
Fig. 2.
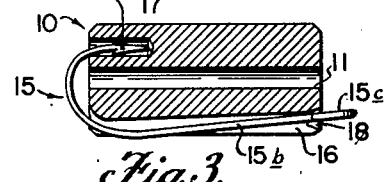
Fig. 6.
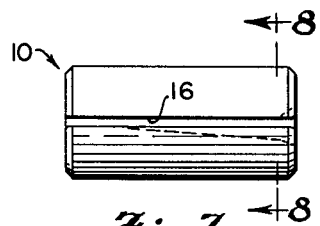
Fig. 7.
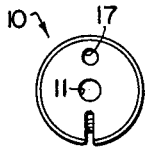
Fig. 5.
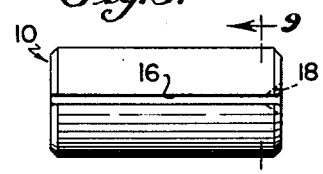
Fig. 3.
Fig. 4.
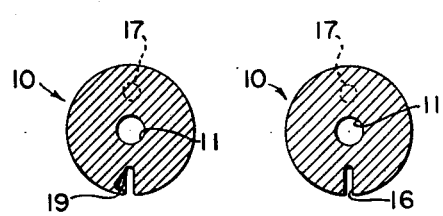
Fig. 8.     Fig. 9.
PAT WARREN
Inventor
By *Herbert J. Brown*
Attorney Patented July 4, 1950

2,514,110

UNITED STATES PATENT OFFICE 2,514,110

FISHHOOK HOLDER

Pat Warren, Fort Worth, Tex.

Application July 15, 1949, Serial No. 104,928

3 Claims. (Cl. 43—57.5)

This invention relates to fishing lines such as described in my copending application, Serial No. 69,695, filed January 7, 1949, and has particular reference to a fish hook holder and protector.

An object of the invention is to provide a simplified construction whereby primary lines having short lines and hooks attached thereto may be conveniently handled so as to prevent tangling and hooking the fisherman's hands when setting out, baiting, and reeling in such lines.

A particular object of the invention is to provide fish hook holders along a primary line and positioned relatively near the connected short lines, and which holders are constructed and arranged in such a manner that the spring action of the hooks may be used for detachedly holding the hooks thereon.

These and other objects will become apparent from the following detailed description of exemplary forms of the invention, taken in connection with the accompanying drawings, wherein:

Figure 1 is an illustration of a river and showing a trotline embodying the present invention thereacross and with the length of said line having the attached short lines beneath the water's surface.

Figure 2 is a perspective view showing a broken length of the primary line and a short line attached thereto, together with a holder mounted on the primary line and engaging the hook of the short line.

Figure 3 is a longitudinal sectional view of the holder illustrated in Figure 2, and showing the position of a hook detachably secured therein.

Figure 4 is an elevation taken at a right angle with respect to Figure 3, and particularly showing the slot for receiving the hook.

Figures 5 and 6 are views of the respective ends of the holder illustrated in Figures 1 through 4.

Figure 7 is an elevation, similar to Figure 4, of a modified form of the invention.

Figures 8 and 9 are sectional views taken on lines 8—8 and 9—9 of Figures 7 and 4, respectively.

The form of the invention illustrated in Figures 2 through 6 is comprised of an elongated body 10 having a longitudinal opening 11 through its length for receiving the primary fishing line 12. There is one such body 10 for each short line 13 attached to the primary line 12, and each body is spaced from the knot 14 where the short line is tied to the primary line. The distance between the body 10 and the knot 14 is substantially equal to the length of the nearby and associated short line 13. The width of the longitudinal opening 11 is preferably substantially equal to the diameter of the primary line 12 so as to frictionally locate each body 10 thereon.

It is well known that conventional fish hooks, such as 15, are usually made of spring steel and that their barbs 15a are not parallel with their shanks 15b. The present holder is provided with a slot 16 in the length of the surface of the holder 10 to receive the fish hook shank 15b. One end of the body 10, and at one side of the longitudinal opening 11, there is a recess 17 to receive the hook barb 15a. On the opposite end of the body 10 there is an enlarged notch 18 in the end of the shank receiving slot 16 so as to partially receive the eyelet 15c of the hook 15.

The length of the body 10 and the depth of the barb receiving recess 17 are such that the eyelet 15c may be engaged in the notch 18 by placing the barb 15a in said recess and, by pulling on the line 12, the eyelet 15c may be positioned within said notch. It is to be understood that within the scope of the present invention the notch is not absolutely necessary as the eyelet 15c will tend to rest against the adjacent end of the body 10 around the end of the shank receiving slot 16.

The form of the invention illustrated in Figures 7 and 8 includes the described elongated body 10, the opening 11 therethrough, the shank receiving slot 16, and the barb receiving recess 17. The second described form of the invention differs from the first in that the shank receiving slot 16 is diagonally undercut, as at 19, to receive and lock the hook shank 15b which, by reason of its conventional construction tends to move in the direction of the diagonal undercut. The hook 15 is attached in the same manner as described for the first form of the invention, and differs therefrom in that substantially the full length of the shank 15b is better secured by reason of its position in the diagonal.

In operation, the hooks 15 are attached to the bodies 10 in either of the described manners when the line 12 is being set or being reeled in. The hooks are removed from the bodies 10 for baiting after the line has been set, and the hooks 15 are replaced in the bodies when the line is taken in. Thus, tangling of the hooks 15 with the short lines 12 may be avoided, and the fisherman is in very little danger of being barbed.

The invention is not restricted to the constructions illustrated and described, but may be made in many ways within the scope of the appended claims.

What is claimed is:

1. A fish hook holder for a primary line having at least one short line and a hook attached thereto by means of an eye integral with said hook, said holder comprising: an elongated body, said body being provided with an opening through the length thereof and for receiving said primary line, a slot in the surface of said body substantially parallel with the length of said opening and adapted to receive the length of the shank of said hook therein, and a recess in one end of said body and located to receive the barb of said hook therein, the length of said body and the depth of said recess being such that the eye of said hook may engage one end of said slot when the barb is in said recess and whereby said hook may be retained on said body under spring tension.

2. A fish hook holder as defined in claim 1, and wherein said body includes an enlarged recess in the shank receiving slot and located in the end of the body opposite the barb receiving recess.

3. A fish hook holder as defined in claim 1, and wherein said body includes a diagonal undercut in the shank receiving slot.

PAT WARREN.

REFERENCES CITED

The following references are of record in the file of this patent:

UNITED STATES PATENTS

| Number | Name | Date |
| --- | --- | --- |
| 2,158,947 | Purdum | May 16, 1939 |
| 366,800 | Watson | July 19, 1887 |